Patented Sept. 7, 1937

2,092,739

UNITED STATES PATENT OFFICE 2,092,739

EXTRACTION PROCESS

Willem J. D. van Dijck, The Hague, Netherlands, assignor to Shell Development Company, San Francisco, Calif., a corporation of Delaware No Drawing. Application January 9, 1935, Serial No. 1,028

6 Claims. (Cl. 196—13)

This invention relates to the separation of hydrocarbon mixtures into their component parts and is more particularly concerned with processes of manufacturing, by extraction, refined products from mineral oils, either crude or produced by distillation, cracking, hydrogenation, solvent extraction, or other processes.

In the recent development of the treatment of mineral oils by extraction processes, a large number of substances were discovered to possess the qualities of selective solvents, that is, of solvents which may be used to separate hydrocarbon mixtures into portions respectively more paraffinic and less paraffinic that the original oil.

It has now been found that a large group of nitrogen ring compounds, i. e. heterocyclic organic compounds having at least one nitrogen atom in the ring, possess to a high degree the properties of selective solvents suitable for treating hydrocarbon mixtures, and may be used according to this invention to improve such of their characteristics as color, viscosity index, Conradson test, etc. This group comprises the following compounds: pyrrole, indole, pyrazole, pyrazoline, pyrazine, piperidine, quinoline, iso-quinoline, etc. and their carbon substituted derivatives formed by the substitution of one or more hydrogen atoms attached to carbon atoms in the ring by an active (polar) group, or radicle, such as alkyls, CN, $NO_2$, CO, OR, SCN, COOR, Cl, O, $NH_2$, CS, where R designates either a hydrogen atom or an alkyl radicle. These carbon substituted derivatives of the basic compounds may be illustrated, for example, by the following substances: alkyl pyrroles, such, for example, as α- and/or β-methyl-and/or ethyl pyrroles, chlor-pyrroles, nitro-pyrroles, cyano-pyrroles, amino-pyrroles, and pyrrylic acids, alkyl indoles, such as methyl and/or ethyl indoles, chlor-indoles, nitro-indoles, cyano-indoles, amino-indoles, and indylic acids, alkyl pyrazoles, such as α and/or β methyl and/or ethyl pyrazoles, pyrazole cyanide, chlor-pyrazoles, nitro-pyrazoles, cyano-pyrazoles, amino-pyrazoles, and pyrazolylic acids, alkyl pyrazolines, such as α and β methyl and/or ethyl pyrazolines, chlor-pyrazolines, nitro-pyrazolines, alkyl pyrazines, such as methyl and/or ethyl pyrazines, chlor-pyrazines, nitro-pyrazines, alkyl piperidine, such as α and/or β and/or γ methyl and/or ethyl piperidines, chlor-piperidines, nitro-piperidines, alkyl quinolines, such as methyl and/or ethyl quinolines, chlor-quinolines, nitro-quinolines, alkyl iso-quinolines, such as methyl and/or ethyl iso-quinolines, chlor-isoquinolines, and nitro-isoquinolines.

Further, the products of mixed substitution of these products may also be used for this process, such, for example, as: cyano-hydroxy-pyrroles, nitro-hydroxy-pyrroles, chlor-hydroxy-pyrroles, chlor-amino-pyrroles, alkyl-amino-pyrroles, cyano-hydroxy-indoles, nitro-hydroxy-indoles, chlor-hydroxy-indoles, chlor-amino-indoles, alkyl-amino-indoles, cyano-hydroxy-pyrazoles, nitro-hydroxy-pyrazoles, chlor-hydroxy-pyrazoles, chlor, amino-pyrazoles, alkyl-amino-pyrazoles, cyano-hydroxy-pyrazolines, nitro-hydroxy-pyrazolines, chlor-hydroxy-pyrazolines, chlor-amino-pyrazolines, alkyl-amino-pyrazolines, cyano-hydroxy-pyrazines, nitro-hydroxy-pyrazines, chlor-hydroxy-pyrazines, chlor-amino-pyrazines, alkyl-amino-pyrazines, cyano-hydroxy-piperidines, nitro-hydroxy-piperidines, chlor-hydroxy-piperidines, chlor-amino-piperidines, alkyl-amino-piperidines, cyano-hydroxy-quinolines, nitro-hydroxy-quinolines, chlor-hydroxy-quinolines, and chlor-amino-quinolines; cyano-hydroxy-isoquinolines, nitro-hydroxy-isoquinolines, chlor-hydroxy-isoquinolines and alkyl-amino-isoquinolines.

It must be noted that some of the nitrogen-heterocyclic compounds, such, for example, as pyridine, are often unsatisfactory as extraction solvents by reason of their excessive miscibility with mineral oils at ordinary temperatures. However, their derivatives of the class defined hereinbefore possess properties which make them highly suitable for the purposes of this invention. Thus alkyl pyridines, such as α- and/or β- and/or γ-methyl-pyridines (picolines), di-methyl-pyridines (lutidines), tri-methyl-pyridines (collidines), ethyl pyridines, propyl-pyridines, cyano-pyridines, chlor-pyridines, nitro-pyridines, amino-pyridines, pyridylic acids, hydroxy-cyano-pyridines, nitro-hydroxy-pyridines, chlor-hydroxy-pyridines, chlor-amino-pyridines, alkyl-amino-pyridines, etc., are all excellent solvents for separating mineral oils into their components by extraction. It must be especially pointed out that the alkyl pyridines, such as the picolines, lutidines and collidines, mono-nitro-pyridines, such as γ-nitro pyridine, form a class of extractants particularly suitable for the purposes of this invention.

So far as the mechanism of the extraction process itself is concerned, it may be carried out in any conventional manner, including the processes of batch or continuous countercurrent extractions, and such as those described in my applications Serial Nos. 455,959, filed May 26, 1930; 567,580 filed October 9, 1931; and 669,580 filed May 5, 1933. The solvents of my invention may be used either alone or in solutions with so-called naphthenic solvents, such as furfural, chlorex, phenols, nitrobenzene, liquid SO₂, etc., and/or solvent diluents such as, benzol and other aromatic hydrocarbons to which they are added in sufficient quantities to modify solvent characteristics. Often it may be desirable to dilute a viscous oil with a paraffinic diluent, such as liquid propane or other paraffinic solvent, and to extract the resultant solution.

The oil-solvent ratios may vary in different cases, depending, together with the temperature of extraction, largely upon the characteristics of the hydrocarbon mixtures being treated and the properties of the desired product; it will be seen from the examples given below that excellent results have been obtained by using 100% and 200% by volume of the solvent.

*Example I.*—A raffinate obtained by an SO₂-benzol extraction of a distillate from Coalinga crude, having a Saybolt universal viscosity of 72 sec. at 210° F. and a viscosity index of 64, was extracted with 200% of a α-picoline, obtained as a derivative from ordinary commercial coaltar, having a specific gravity of .950 and boiling at about 129° C. The treatment yielded 50% of raffinate having a Saybolt universal viscosity of 70.5 secs. at 210° F., a viscosity index of 94, and a markedly improved color.

*Example II.*—A raffinate obtained from a liquid SO₂ treatment of a distillate of Coalinga crude and having a Saybolt universal viscosity of 52 sec. at 210° F., a viscosity index of 62, and an A. S. T. M. color of 3½, was extracted with 100% of quinoline at 32° F. The raffinate obtained has a Saybolt universal viscosity of 52.5 sec. at 210° F., a viscosity index of 79, and an A. S. T. M. color of 2+.

*Example III.*—A Pennsylvanian lubricating oil with a viscosity index of 105 and an A. S. T. M. color of 7+ was extracted with 100% of quinoline, giving a raffinate with a viscosity index of 116 and an A. S. T. M. color of 6+.

*Example IV.*—A mixed lubricating oil having a Saybolt universal viscosity of 70 sec. at 210° F., a viscosity index of 15 and an A. S. T. M. color of 3½+, was extracted with 100% of quinoline at 30° F. The raffinate obtained had a Saybolt universal viscosity of 64.5 sec. at 210° F., a viscosity index of 57 and an A. S. T. M. color of 1½+.

*Example V.*—A lubricating oil obtained by an SO₂-benzol treatment of a Coalinga distillate, and having a gravity of 25.7° A. P. I. a Saybolt universal viscosity of 58.7 sec. at 210° F., and a viscosity index of 69, was extracted with 100% of beta-gamma picoline at −40° F. The raffinate obtained had a gravity of 26.5 A. P. I. a Saybolt universal viscosity of 57.9 sec. at 210° F., and a viscosity index of 72, and a greatly improved color.

The foregoing examples serve merely to illustrate the results of extracting hydrocarbon oils with some of the new solvents, other solvents disclosed hereinbefore being also very effective.

The extraction of oils with these new solvents may either precede or follow an extraction of the oil with other solvents. Thus, as described in the Examples I and II, an oil was first extracted with SO₂-benzol solution in one case and with liquid SO₂ in the other case, and the resulting raffinates (the oil portions of the raffinate phases) were further refined by extraction with the solvents of this invention. Often it is desirable to extract with my solvents the raffinate or extract phases (oil plus a solvent) produced by refining with other solvents, without first freeing the oil from the solvent prior to such an extraction. The advantage of such a method resides in the elimination of the step of separating the oil from the solvent between the two extraction steps, and also in the improved extraction efficiency resulting from the combined effect of the two solvents in the oil.

As an example, a hydrocarbon oil may be first extracted with liquid SO₂, or furfural, or chlorex, or cresylic acid, or phenol, or nitro-benzene, or some other selective solvent, or a mixture of some of these solvents. In many cases the oil in the resulting raffinate phase, that is, in the solution of the solvent in the less soluble portion of the original oil, will have excellent characteristics in so far as the concentration of paraffinic components, the viscosity index, etc., are concerned, but will fail, for example, to possess a sufficiently good color. In such cases it is of great advantage to extract this phase further with one of the solvents of this invention or their mixture whereby a raffinate phase consisting of a highly refined oil and a mixture of the two solvents is obtained; the oil is then separated, e. g. by distillation either with or without steam, from the solvents, and each solvent may be separated from the other. The extract phase, i. e. the solution of a less paraffinic portion of the oil being treated in the solvents used, is also treated to separate oil and the solvents. The recovered solvents may then be used again in the process.

On the other hand, it was often found very advantageous to extract the fractions of hydrocarbon oils containing asphaltic substances, first with the solvents of this invention, used in the amounts which may be relatively small but sufficient to produce a positive effect in so far as the subsequent treatment with other solvents is concerned, and following this treatment of the oil by extracting the raffinate or the raffinate phase with such solvents as liquid SO₂ or furfural, or chlorex, or their equivalents mentioned hereinbefore. In the processes of this type the alkylated and/or nitrated derivatives of pyridine, quinoline, isoquinoline, piperidine, pyrrole and indole, were found particularly suitable for the first step of this process, whereby the asphaltic components of the oil are removed as extract without a great loss of the non-asphaltic components. The deasphaltized oil, i. e. either the raffinate phase or the raffinate separated at this stage, is then refined by extraction with a different selective solvent, such as liquid SO₂ or its equivalents, or some other nitrogen-containing heterocyclic compounds described hereinbefore, the resulting raffinate and extract phases are separated from each other and each is treated further to separate oil and the solvent used.

For any of the above described methods of extracting hydrocarbon oils, it may often be desirable, when employing the solvents of this invention to carry out the process in accordance with my invention disclosed in the application Serial No. 455,959, i. e. to counterflow one of the solvents of the present invention and another solvent of the type of liquid hydrocarbons, such as liquid propane, liquid butane, gasoline distillates, kerosenes, etc., often referred to as paraffinic solvents, through an extraction zone, while introducing at an intermediate point thereof the hydrocarbon mixture to be extracted. Upon being brought into contact with the two counterflowing solvents under suitable extracting conditions of temperature and pressure, the oil together with the solvents forms two liquid phases which separate within the extraction zone and are withdrawn therefrom. The withdrawn phases may then be treated to separate their oil portions from both or one of the solvents, or they may be subjected again to solvent extraction.

It is to be understood that by identifying the solvents of this invention by chemical names, it is intended to include not only the chemically pure substances, but also the products of commerce which may contain various impurities, as well as various solutions and mixtures containing effective quantities of these substances and suitable for treating hydrocarbon oils by solvent extraction. Among such products may be listed the nitrogen bases obtained from coal tar and petroleum products by various processes such, for example, as extraction with mineral acids, since these bases contain considerable amounts of the heterocyclic compounds with a nitrogen atom in their ring. These nitrogen bases may be used for the purposes of this invention in such form as they are obtained in commercial process, or they may be subjected to a preliminary purification to increase the percentage of the heterocyclic compounds contained therein. It is understood that they may be used, according to this invention, in combination with any other solvents, such as furfural, nitro-benzene, chlorex, etc., and that the extraction with nitrogen bases may precede or follow the extraction with these conventional solvents. It should be particularly noted that the nitrogen bases containing heterocyclic compounds with a nitrogen atom in their ring were found to be especially effective in removing asphaltic components of mineral oils without causing considerable losses of non-asphaltic materials.

It is also understood that the nitrogen ring compounds, or the commercial products containing effective quantities of these compounds can be advantageously used in dewaxing mineral oils. The oil to be dewaxed, such, for example, as the raffinate phase obtained in an extraction process, may be saturated, either in the presence or in the absence of a dewaxing diluent, such as light naphtha, liquid propane, benzol, etc., with one of the nitrogen ring compounds forming the subject of this invention, the mixture being subsequently chilled and the wax separated in conventional manner.

I claim as my invention:

1. In the process of treating a hydrocarbon oil containing asphaltic components, the steps of removing these asphaltic components by bringing the oil in contact with a quantity of a solvent comprising a carbon substituted derivative of a nitrogen ring compound containing as substituents at least one of the following radicles: $CN$, $NO_2$, $CO$, $OR$, $COOR$, $Cl$, and $O$, and where $R$ designates a member of the group: hydrogen atom and alkyl radicles, said quantities being just sufficient to remove the asphaltic components without affecting the other components of the oil, separating the oil-solvent mixture into raffinate and extract phases, and subjecting the oil component of the raffinate phase to a second extraction with a naphthenic solvent to increase the concentration of the paraffinic components of the oil.

2. In the process of treating a hydrocarbon oil, the steps of extracting the oil with a naphthenic solvent to produce a raffinate of a higher paraffinic content than the original oil but containing oil-coloring substances, and then extracting said coloring substances from the raffinate with a solvent comprising a carbon substituted derivative of a nitrogen ring compound containing as substituents at least one of the following radicles: $CN$, $NO_2$, $CO$, $OR$, $COOR$, $Cl$, and $O$, and where $R$ designates a member of the group: hydrogen atom and alkyl radicles.

3. A process for extracting a hydrocarbon oil to separate it into portions of different compositions, comprising the step of bringing said oil in contact with an effective quantity of a carbon substituted derivative of a nitrogen ring compound containing as a substituent at least one of the following radicles: $CN$, $NO_2$, $CO$, $OR$, $COOR$, $Cl$ and $O$, where $R$ designates a member of the group: hydrogen atom and alkyl radicles, thereby forming two liquid phases.

4. A process for extracting a hydrocarbon oil to separate it into portions of different compositions, comprising the step of bringing said oil in contact with an effective quantity of chlorquinoline, thereby forming two liquid phases.

5. A process for extracting a hydrocarbon oil to separate it into portions of different compositions, comprising the step of bringing said oil in contact with an effective quantity of nitropyridine, thereby forming two liquid phases.

6. A process for extracting a hydrocarbon oil to separate it into portions of different compositions, comprising the step of bringing said oil in contact with an effective quantity of a carbon substituted nitrogen ring compound containing as substituent at least one $NO_2$ radical, thereby forming two liquid phases.

WILLEM J. D. van DIJCK.